(12) United States Patent
Springer

(10) Patent No.: US 7,354,236 B1
(45) Date of Patent: Apr. 8, 2008

(54) APPARATUS FOR THE LOADING AND UNLOADING OF MOTORCYCLES AND OTHER CARGO INTO TRANSPORTING VEHICLES

(75) Inventor: William O. Springer, Fargo, ND (US)

(73) Assignee: Springer Family Patents Limited Partnership, Fargo, ND (US)

( * ) Notice: Subject to any disclaimer, the term of this patent is extended or adjusted under 35 U.S.C. 154(b) by 286 days.

(21) Appl. No.: 10/938,359

(22) Filed: Sep. 9, 2004

(51) Int. Cl.
    B60P 1/00 (2006.01)
(52) U.S. Cl. .................................... 414/538; 414/477
(58) Field of Classification Search ........ 414/462–466, 414/477, 500, 430, 538
    See application file for complete search history.

(56) References Cited

U.S. PATENT DOCUMENTS

| | | | | |
|---|---|---|---|---|
| 3,127,041 A | * | 3/1964 | Flynn et al. ............... | 414/477 |
| 3,330,432 A | * | 7/1967 | Blackburn et al. .......... | 414/494 |
| 4,133,439 A | * | 1/1979 | Goranson .................. | 414/494 |
| 5,556,249 A | | 9/1996 | Heine ...................... | 414/500 |
| 5,730,577 A | | 3/1998 | Jones ...................... | 414/462 |
| 5,755,549 A | | 5/1998 | Ogrodnick ................. | 414/500 |
| 5,839,875 A | * | 11/1998 | Miller et al. .............. | 414/462 |
| 5,934,863 A | * | 8/1999 | Beck ....................... | 414/538 |
| 6,354,785 B2 | * | 3/2002 | Maeno ..................... | 414/477 |
| 6,413,033 B1 | * | 7/2002 | Monroig, Jr. .............. | 414/480 |
| 6,419,247 B1 | * | 7/2002 | Moran ..................... | 280/86.5 |
| 6,561,746 B1 | | 5/2003 | Broussard et al. .......... | 414/500 |
| 6,634,849 B2 | | 10/2003 | Clary ...................... | 414/538 |
| 6,698,994 B2 | * | 3/2004 | Barrett .................... | 414/462 |
| 6,739,823 B2 | | 5/2004 | Shirvell ................... | 414/462 |
| 2003/0086778 A1 | * | 5/2003 | Smith ...................... | 414/500 |

* cited by examiner

Primary Examiner—Saul Rodriguez
Assistant Examiner—Joshua I Rudawitz

(57) ABSTRACT

This motorcycle loading and unloading apparatus employs a carriage to which a motorcycle can be attached and a slide body which facilitates the movement of the carriage and attached motorcycle from the ground and into the back of an open pickup truck. The carriage has an attached loading system that aids in unloading the carriage by biasing the carriage towards an unloaded position.

19 Claims, 15 Drawing Sheets

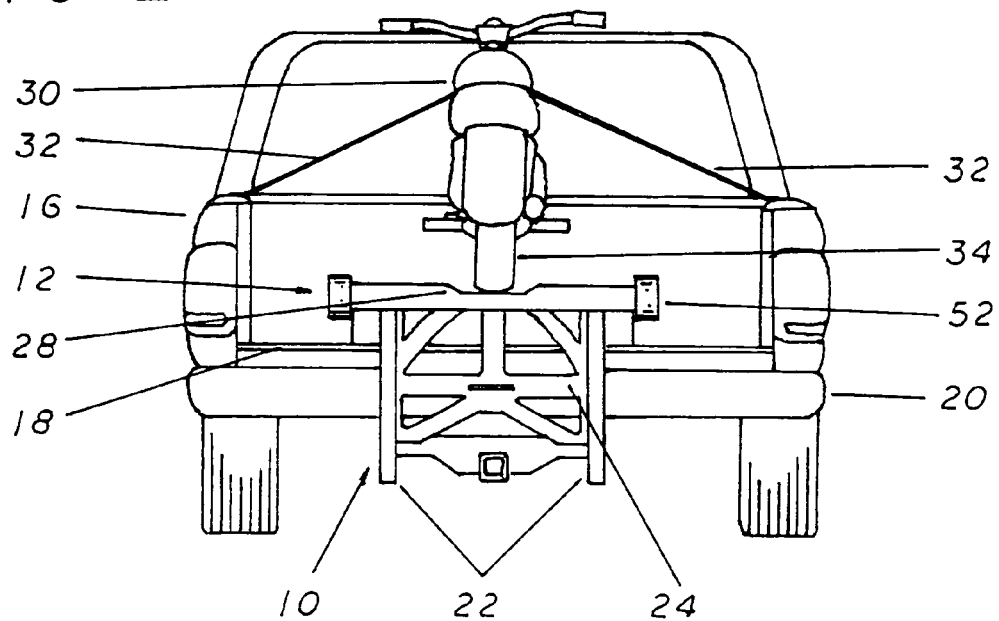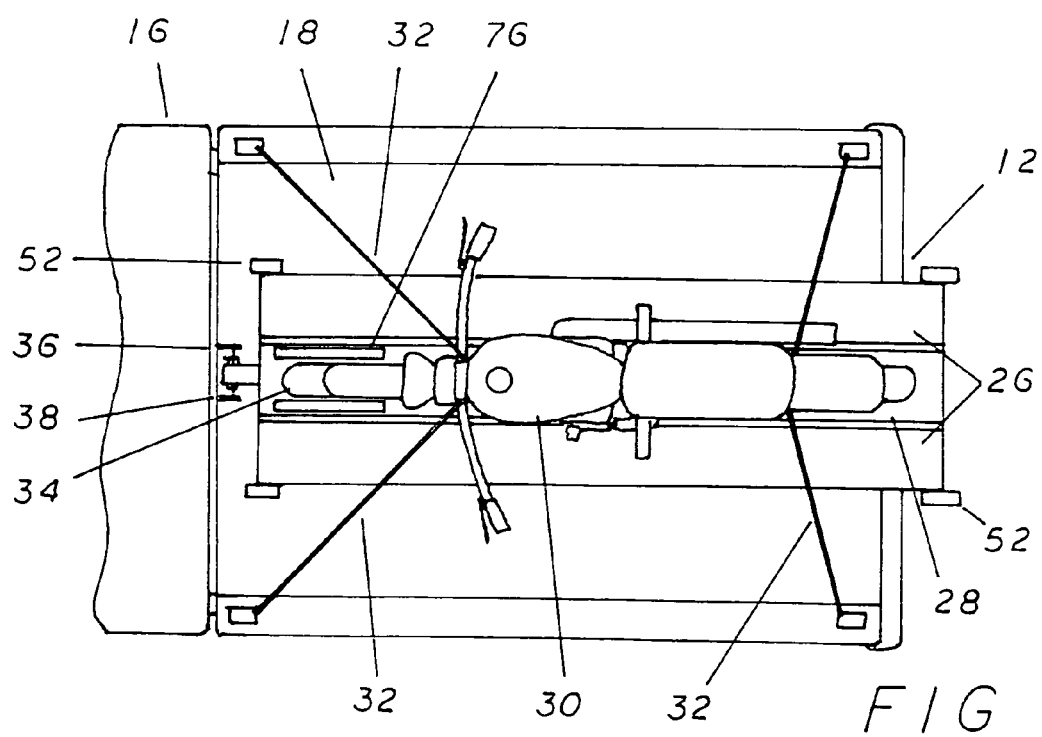

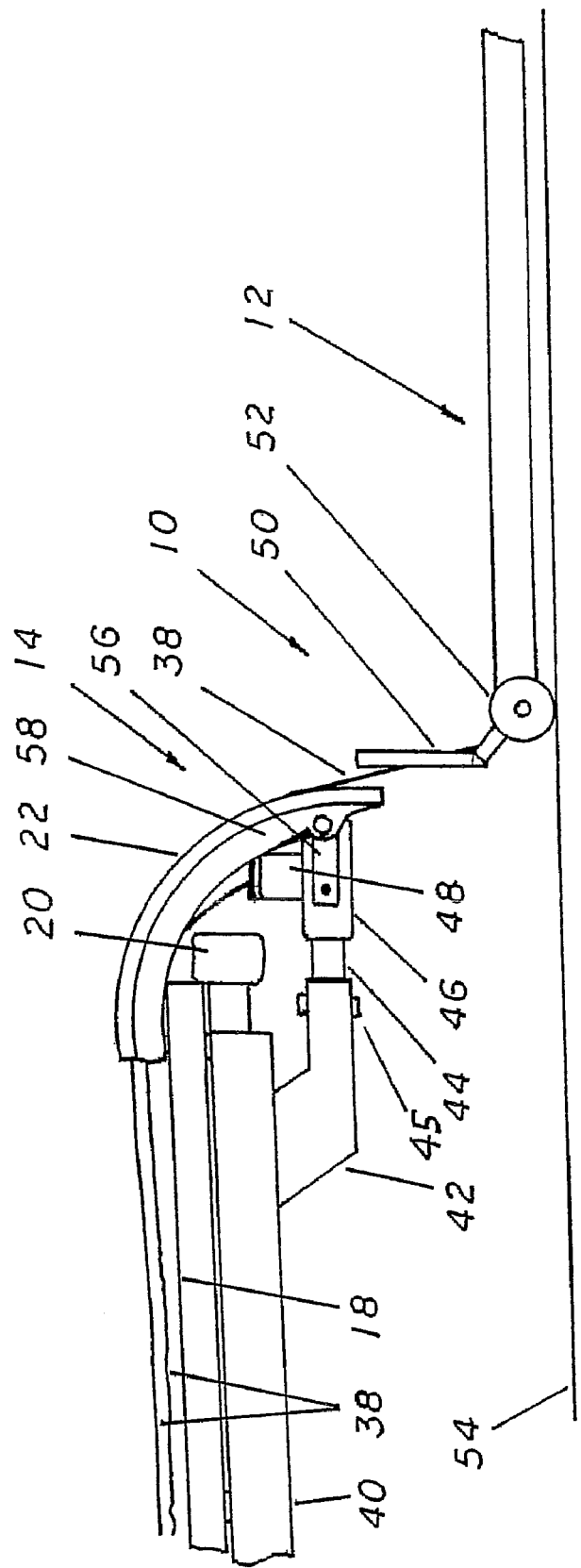

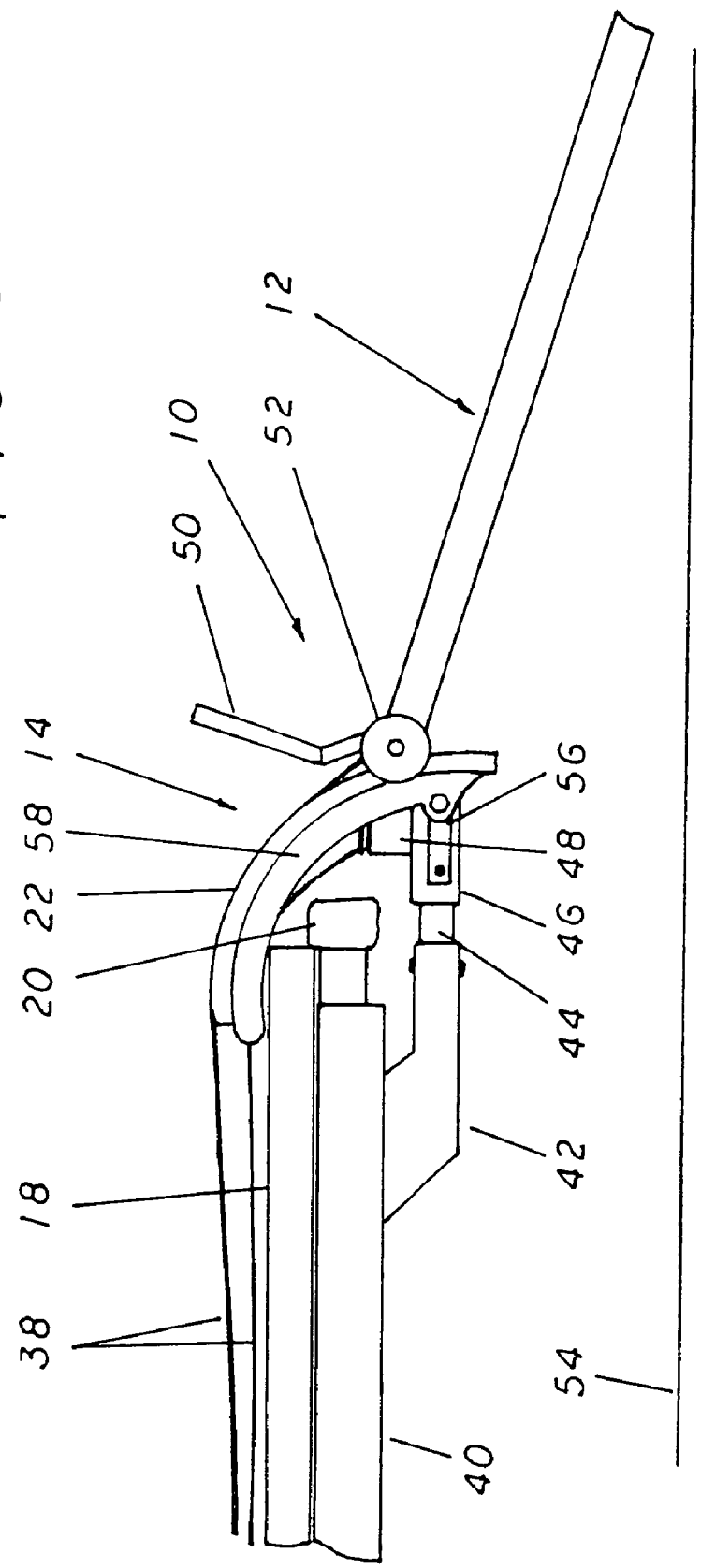

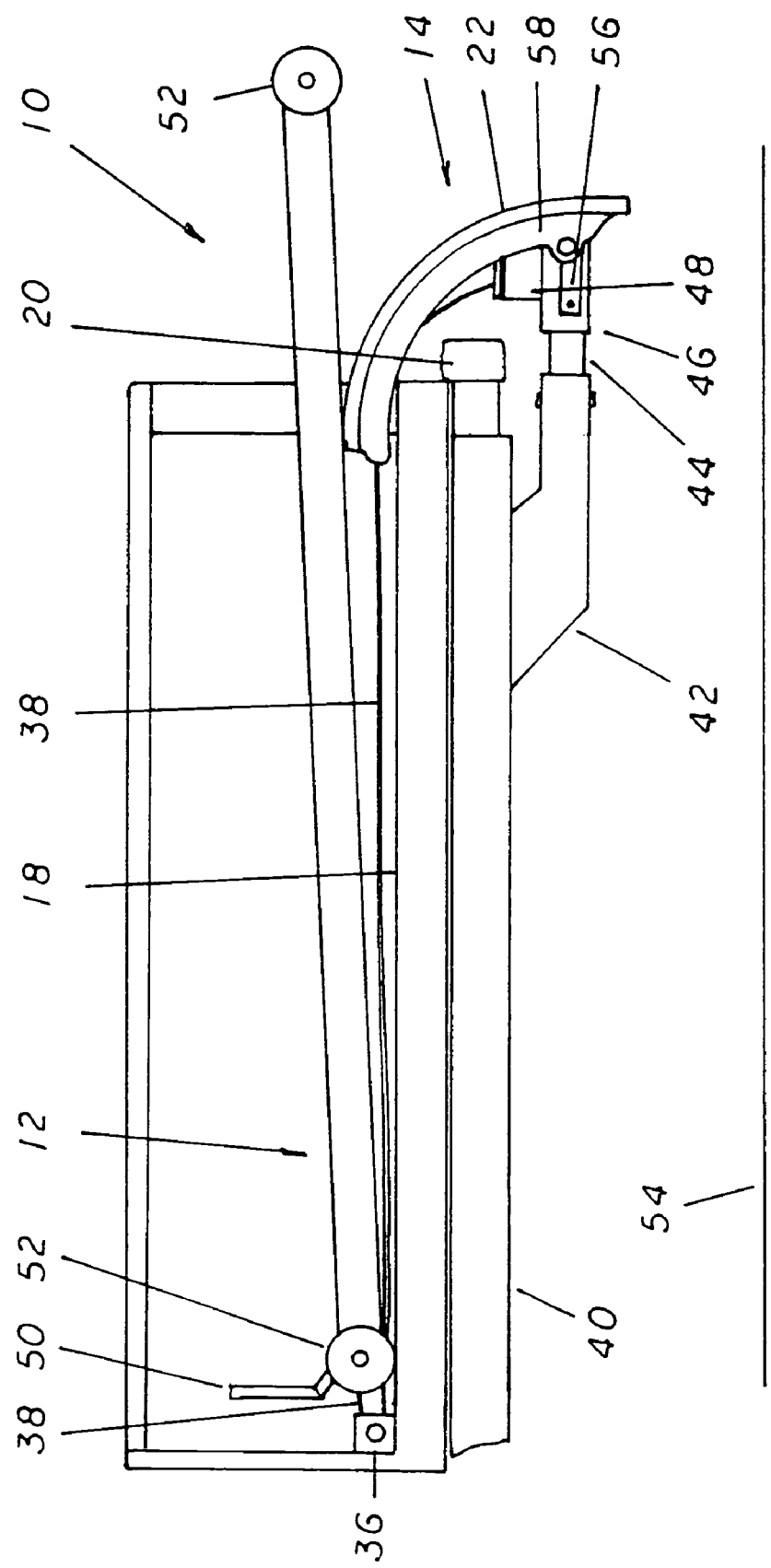

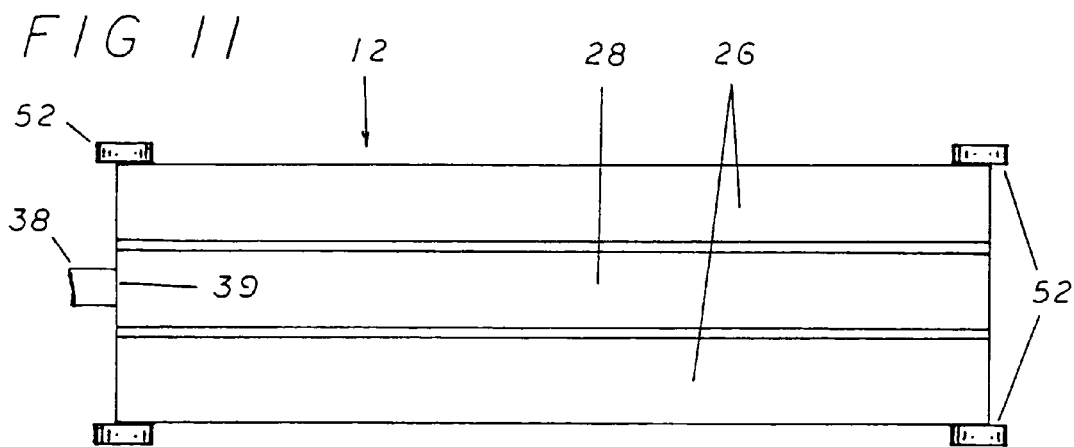
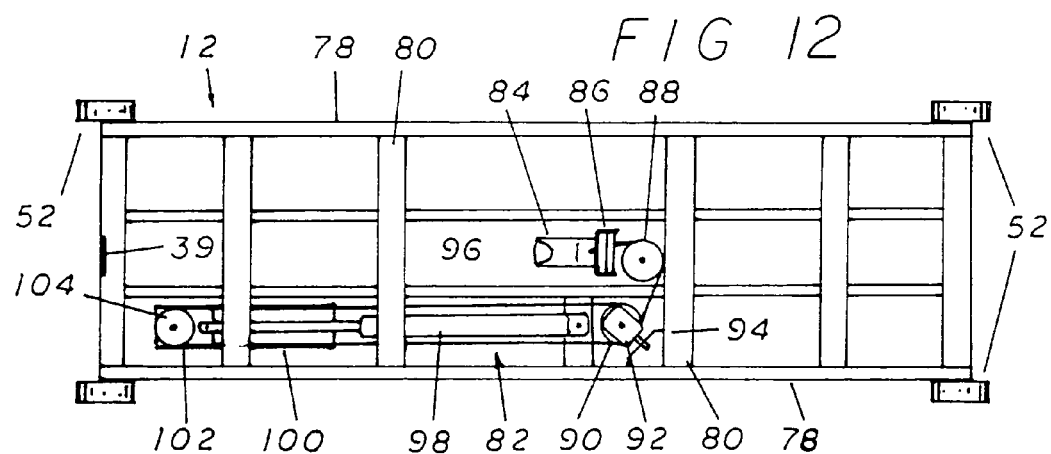
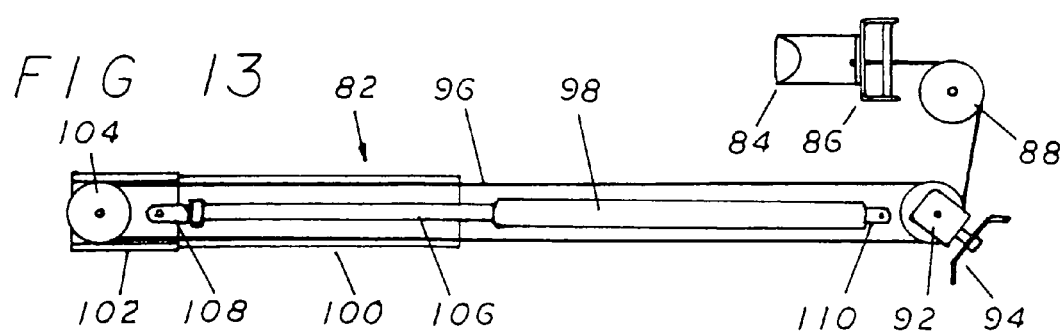

APPARATUS FOR THE LOADING AND UNLOADING OF MOTORCYCLES AND OTHER CARGO INTO TRANSPORTING VEHICLES

BACKGROUND OF THE INVENTION

The present invention relates to an improvement in the apparatuses that are employed in the loading and unloading of cargo into the cargo areas of transporting vehicles. More specifically, to an apparatus that is designed in such a manner that makes it particularly adept at facilitating the loading and unloading of motorcycles or other similar vehicles into the open cargo area of a pickup truck or other flat-bedded transport vehicles.

Initially, it must be noted that while the present invention is commonly employed in conjunction with motorcycles, it will function equally as well with other similar vehicles or even more conventional loads such as bricks or other typical construction materials. However, for the purposes of simplicity and clarity, the primary, but not sole, focus of the discussion contained herein will be its application as it pertains specifically to motorcycles.

The use of motorcycles is at an all time high in the general public today. This high rate of use has presented a number of specific problems that are associated with their use. One of these problems stems from the fact that motorcycles are often loaded onto other transport vehicles to move them from place to place. This can create significant difficulties as motorcycles are often very heavy and cumbersome vehicles that are difficult to maneuver, especially in confined spaces such as the bed of a pickup truck. This is especially true with the larger cruiser motorcycles that are becoming more and more popular all the time. Additionally, these problems are only exacerbated by the fact that it is often necessary for these procedures to be accomplished by an individual. Thus, the desire and necessity to transport motorcycles and other similar vehicles by means other than their own propulsion systems often requires the use of specialized equipment to facilitate their loading and unloading into the beds of pickup trucks.

The simplest and possibly most common approach to the loading problems is the use of a ramp. In this approach, a section of planking most often comprising a simple wooden board the ground or other surface upon which the motorcycle rests. The placement of the plank in this manner creates a ramp between the ground and the pickup bed that the motorcycle can then transverse to gain access to or be removed from the bed of the pickup truck.

While the use of the above described ramp apparatus does provide a means of accomplishing the stated purpose, it has many inherent difficulties. The first of these is that it generally requires that the user actually drive the motorcycle up the ramp under its own power during the loading process. Conversely, it is most often sufficient to rely on gravity to provide the necessary motion during the unloading operation. In either case, the difficulty arises in the necessity of maintaining forward momentum and balance while crossing the plank. The possible dangers associated with these problems are potential damage to the motorcycle from falling off the plank and of course, injury to the person doing the loading.

Another potential problem associated with the use of a simple plank is a result of its simple nature; that being there is no adequate way to anchor either the end associated with the pickup truck bed or that which rests upon the ground. This critical aspect of its nature means that the plank can slip at any point during the loading or unloading process resulting in the same damage to the motorcycle or injury to the operator as described above. Therefore, the use of a plank to form a ramp for the purposes of loading and unloading motorcycles to and from a pickup truck is clearly an inadequate solution to the problems it attempts to solve.

A number of possible solutions to the problems associated with plank loading of motorcycles have been proposed and are commonly employed. The first of these involves the use of supplemental trailers that are towed behind a vehicle to carry the motorcycle. While trailers can and do solve the loading and unloading problems described above through the use of tilting beds and other similar devices, they present problems all their own that make their use for this purpose less than ideal. Most prevalent of these include their relatively high cost and the maneuvering difficulties that are commonly associated with trailers and towing vehicles. Thus, the use of supplemental trailers offers a less than ideal solution to the problem of loading and unloading motorcycles for the purposes of transporting them.

The loading and unloading of motorcycles as it pertains specifically to pickup trucks has spawned a number of tailored solutions. These range from elaborate systems that are built into and fixedly attached to the pickup bed and which employ powered systems for lifting the motorcycle to those which are detachable and manually powered. The major problems with the elaborate and powered models is that they are very expensive and take up most of the available space in the pickup truck's bed. The first problem makes their use less accessible to the general public and the second lessens the utility of the pickup truck. Thus, the elaborate loading mechanisms offer less than ideal solutions to the problem at hand.

Similarly, the simpler solutions to the loading and unloading problems also suffer from significant shortcomings. These include a lack of power needed to raise the motorcycle from the level of the ground to the level of the pickup bed. The amount of energy to accomplish this feat can be quite high especially in the case of the larger motorcycles. This situation results in a similar outcome as described for the use of a simple ramp in that it is extremely difficult for it to be accomplished safely by a single person. Consequently, these apparatuses are essentially useless unless there are more than one person to perform the loading operations. Additionally, the mechanisms typically employed to secure these apparatuses to the pickup bed are cumbersome and difficult to use. Therefore, these proposed solutions in reality offer no better answers than those discussed above.

Thus, it can be seen that it would be desirable to provide an apparatus that allows for the loading and unloading of motorcycles into the back of pickup trucks in such a manner so that a single person can accomplish the loading operation irrespective of the size of the motorcycle. Additionally, it can be seen that it would be desirable to provide such an apparatus which allows the operator to maintain complete control over the motorcycle in all phases of the loading and unloading procedures. Also, it can be seen that it would be desirable to provide such an apparatus which can be easily and quickly attached and removed from the pickup which serves to enhance the use of the bed for alternative purposes. Finally, it can also be seen that it would be desirable to provide such an apparatus which employs an independent power source to lift the motorcycle into the pickup bed.

SUMMARY OF THE INVENTION

It is the primary objective of the present invention to provide an apparatus that allows for the loading and unloading of motorcycles into the bed of pickup trucks in such a manner so that an individual can accomplish the loading operation without the aid of other people irrespective of the size of the motorcycle.

It is an additional objective of the present invention to provide such a motorcycle loading and unloading apparatus which allows the operator to maintain complete control over the motorcycle in all phases of the procedure.

It is a further objective of the present invention to provide such an apparatus which can be easily and quickly attached and removed from the pickup into which the motorcycle is to be loaded.

Finally, it is a still further objective of the present invention to provide such an apparatus which employs an independent power source to lift the motorcycle into the pickup bed.

These objectives are accomplished by the use of a motorcycle loading and unloading apparatus that is made up of two primary components. The first of these is the slide body which is the component of the present invention that makes the actual physical attachment to the pickup truck or other similar vehicle. The slide body is primarily composed of two vertically oriented slide rails which, when viewed from the side in profile, take the shape of quarter circles having their circular surfaces oriented in an upward and rearward manner. Additionally, the slide rails outer edges are formed of a high molecular weight plastic. The use of this material provides an outer surface which is both relatively friction free and long lasting. These two characteristics are pivotal to the operation of the present invention which will become more clear with further discussion to follow.

The slide rails of the slide body are mounted to a body frame. The body frame is made up of a formed piece of sheet metal that has been formed to mimic the shape of and provide a base for the slide rails. Additionally, the lower inside portion of the body frame provides the point of attachment for the receiver tongue. The receiver tongue is the component of the present invention which is employed to attach the slide body to the rear portion of the pickup truck. This attachment is accomplished by sliding the receiver tongue into the receiver hitch positioned in the standard location at the rear of the pickup truck. This attachment is accomplished in the same manner by which a standard trailer is attached. This method of attaching the slide body to the pickup truck enables it to be accomplished in a timely fashion which is also completely secure thus, providing the necessary stability to the present invention. Additionally, it also allows the present invention to be easily removed from the pickup in the case where its loading capability is not needed. This frees up the bed of the pickup for alternative uses.

The mechanisms of the present invention which supply the lifting power used to load and unload a motorcycle are also contained within the slide body. The first of these is the winch which is located behind the body frame and above the receiver tongue. The winch is electrically powered, this power can be drawn from the vehicle's electrical system or from an auxiliary battery. The winch is employed to control the deployment of the strap which in turn is fixedly attached at one end to the strap cylinder of the winch and to the forward surface of the motorcycle carriage. Between the winch and the point of attachment at the carriage, the strap also passes through the forward pulley generally positioned at the most forward center of the truck bed. The forward pulley serves to place the pull point exerted by the winch through the strap at a position by which the carriage can be pulled all the way to the forward area of the truck bed. This function is important to the operation of the present invention as will become clear upon further discussion. The result of this method of attachment is that the winch then controls the relative position of the motorcycle carriage which in turn is the component of the present invention to which a motorcycle is attached during the loading and unloading processes.

The other major component of the present invention is the motorcycle carriage which is a flat rectangular apparatus generally shaped like a wide and flat plank. The motorcycle carriage is composed of two raised upper carriage surfaces and an inner recessed surface. The inner recessed surface runs the length of the motorcycle carriage through its center and between the outer carriage surfaces. The primary purpose of the recessed surface is to provide a channel-like configuration which will serve to contain and position the motorcycle in the proper location on the carriage. The carriage is generally also equipped with an additional anchoring device to which the motorcycle is fixed during the loading and unloading operation. The anchoring device provides a point to which the front tire of the motorcycle can be anchored ensuring that the motorcycle is mounted securely.

The front end of the carriage is also equipped with a pair of rail guides which extend upwards from the outer corners of the outer carriage surfaces in a perpendicular manner. The rail guides are positioned on the carriage in such a manner so that when it is lined up with the slide rails of the slide body, the rail guides will be positioned adjacent to the slide rails. The rail guides purpose is to engage the slide rails in the early stages of the loading operation to ensure that the carriage engages the slide body in the proper manner. Once the beginning phases of the operation are completed, the rail guides have completed their function and are no longer important in the operation of the invention.

The loading operation of the present invention is commenced by first placing the carriage on the ground behind the pickup truck and in a position so that it can engage the slide body when necessary. With this completed, the motorcycle is then positioned on and attached to the carriage as described above. The winch is then engaged to retract the strap by winding it around the strap cylinder. This action serves to draw the attached carriage towards the rear of the pickup truck and the attached slide body. As the process continues, the retraction of the strap draws the two extending rail guides to the point at which they engage their respective slide rails. At this time the front end of the carriage begins to rise up until its lower surface also engages the slide rails. The retraction of the strap then continues drawing the carriage up and over the slide rails and into the pickup truck bed. This action continues until the carriage, and the attached motorcycle, are completely drawn into the bed. Once the motorcycle is properly positioned within the pickup truck bed, it is secured there by the use of a plurality of anchoring straps that span the distance between the motorcycle and the sides of the pickup truck bed.

An important aspect of the present invention manifests itself in the final stages of the motorcycle loading process. This aspect is the action of the carriage loading system which functions to place an outward load on the carriage as it is pulled into the forward portion of the pickup truck bed. The purpose of the carriage loading system in general terms is to aid in moving the carriage and attached motorcycle rearward in the initiation of the unloading process. This component is necessary because the most difficult portion of the unloading process is to overcome the inertia of the stationary carriage and motorcycle and get the carriage moving rearward to the point where it can be removed from the pickup truck. The use of the carriage loading system turns this process into a simple matter of removing the restraint that is holding the carriage in place in the forward end of the pickup truck bed.

The carriage loading system is made up of a moveable hook, a series of pulleys and associated cable, and charged cylinder. During the latter stages of the motorcycle loading process, the moveable hook catches the upper portion of the slide body as the carriage passes over it. As the carriage continues forward in relation to the slide body, the pulleys and cables contract which in turn compresses the charged cylinder contained between two of the pulleys. The compression of the charged cylinder places the outward pressure on the carriage which is contained by the winch through the strap. Therefore, the unloading process is initiated by releasing this restraining action which in turn allows the charged cylinder to expand. This expansion in turn then forces the carriage in an outward manner thereby beginning the unloading process. In all other respects, the unloading of the carriage and motorcycle is completed by simply reversing the loading steps described above.

An additional embodiment of the present invention is contemplated in which the winch is moved from its position within the slide body and placed on the forward portion of the truck bed. In fact, the winch is positioned at this location in approximately the same location which normally contains the forward pulley. The positioning of the winch in this location alleviates the need for the forward pulley thereby placing the power of the winch at precisely the point it is needed. Thus, with the winch placed in this position it can directly draw the carriage into the truck bed or lower it back to the ground during loading and unloading operations.

The positioning of the winch in the forward portion of the truck bed is accomplished by the use of the adjustable winch frame. The adjustable winch frame is made up of a pair of frame members that extend rearwards from their point of attachment to the slide body forward into the truck bed. Additionally, the most forward ends of the frame rails are spanned by the frame end member which functions to tie the forward ends of the frame members together. The frame end member also serves as the point of attachment for the winch at a point where the carriage strap is properly positioned to engage and manipulate the carriage and attached motorcycle.

The attachment of the frame members to the slide body is accomplished by the use of the frame brackets. The frame brackets fixedly attach at one of their ends to the outside surface of the slide body, one on either side of the slide body. The other end of the frame brackets serve for the point of adjustable attachment of the frame members. The adjustable attachment is accomplished by the use of at least two bolts that extend through the frame brackets and frame members which are secured in place by the use of a corresponding number of nuts. Additionally, the frame members are equipped with a plurality of attachment holes which allow for the attachment of the frame brackets in varying positions. This method of construction allows the frame members position to be varied in a longitudinal manner which in turn allows the overall length of the winch frame to be adjusted. This adjustment allows the winch frame to be expanded or contracted to match the size of the truck bed within which the present invention is deployed. Thus, the use of the adjustable winch frame allows the winch of the present invention to be positioned at the most forward point in the truck bed. This positioning of the winch in turn eliminates the need for the use of the forward pulley and provides a more efficient means of drawing the carriage up into the truck bed.

A still further embodiment of the present invention is contemplated in which the carriage is equipped with a motorcycle tie down bracket. The motorcycle tie down bracket provides a means by which the motorcycle may be secured to the tie down bracket. The use of the motorcycle tie down bracket enhances the loading and unloading procedures of the present invention as it provides a means by which the motorcycle can be secured in its vertical position.

The motorcycle tie down bracket as configured is made up of a pair of triangular bracket towers which are attached to the outside forward corners of the upper surface of the carriage. The upper surfaces of the triangular bracket towers serve as the point of attachment for the bracket cross tube. The bracket cross tube serves two functions. The first of these is to limit the forward travel of the motorcycle tire. The limiting of the motorcycle tire's forward travel provides a solid point upon which pressure can be exerted in the securement of the motorcycle to the carriage. Another way to view this function of the bracket cross tube is that it serves as the anchor for the positioning of the motorcycle during the securement process.

The other function of the bracket cross tube is to provide the point of attachment for the two tie down eyelets. The tie down eyelets in turn allow for the attachment of the straps employed to secure the motorcycle to the carriage. The tie down eyelets are positioned on either outer end of the bracket cross tube in the positions that best facilitate the securement of the motorcycle. Thus, the use of the motorcycle tie down bracket allows the motorcycle to be fully secured to the carriage of the present invention prior to the loading operation. This enhances the operation of the present invention as it provides a means of loading and unloading a motorcycle while lessening the risk of damage to the motorcycle or injury to the operator during the loading process.

For a better understanding of the present invention reference should be made to the drawings and the description in which there are illustrated and described preferred embodiments of the present invention.

DESCRIPTION OF THE DRAWINGS

FIG. 2 is a rear elevation view of the present invention of FIG. 1 illustrating it as attached to a pickup truck and retaining a motorcycle therein.

FIG. 3 is a top elevation view of the present invention of FIG. 1 illustrating it as attached to a pickup truck and retaining a motorcycle therein.

FIG. 4 is a side elevation view of the present invention detailing the manner by which it is attached to the body of a pickup truck and the position of the carriage at the beginning of the loading operation.

FIG. 5 is a side elevation view of the present invention of FIG. 4 detailing the position of the carriage at approximately the halfway point of the loading operation.

FIG. 6 is a side elevation view of the present invention of FIG. 4 detailing the position of the carriage at the completion of the loading operation.

FIG. 11 is a top elevation view of the carriage component of the present invention illustrating its general overall configuration.

FIG. 12 is a bottom elevation view of the carriage component of the present invention of FIG. 11 illustrating the general configuration of the carriage loading system and its major components.

FIG. 13 is a top elevation view of the carriage loading system component of the present invention illustrating the orientation of its major components.

DESCRIPTION OF THE PREFERRED EMBODIMENT

Figure 1:
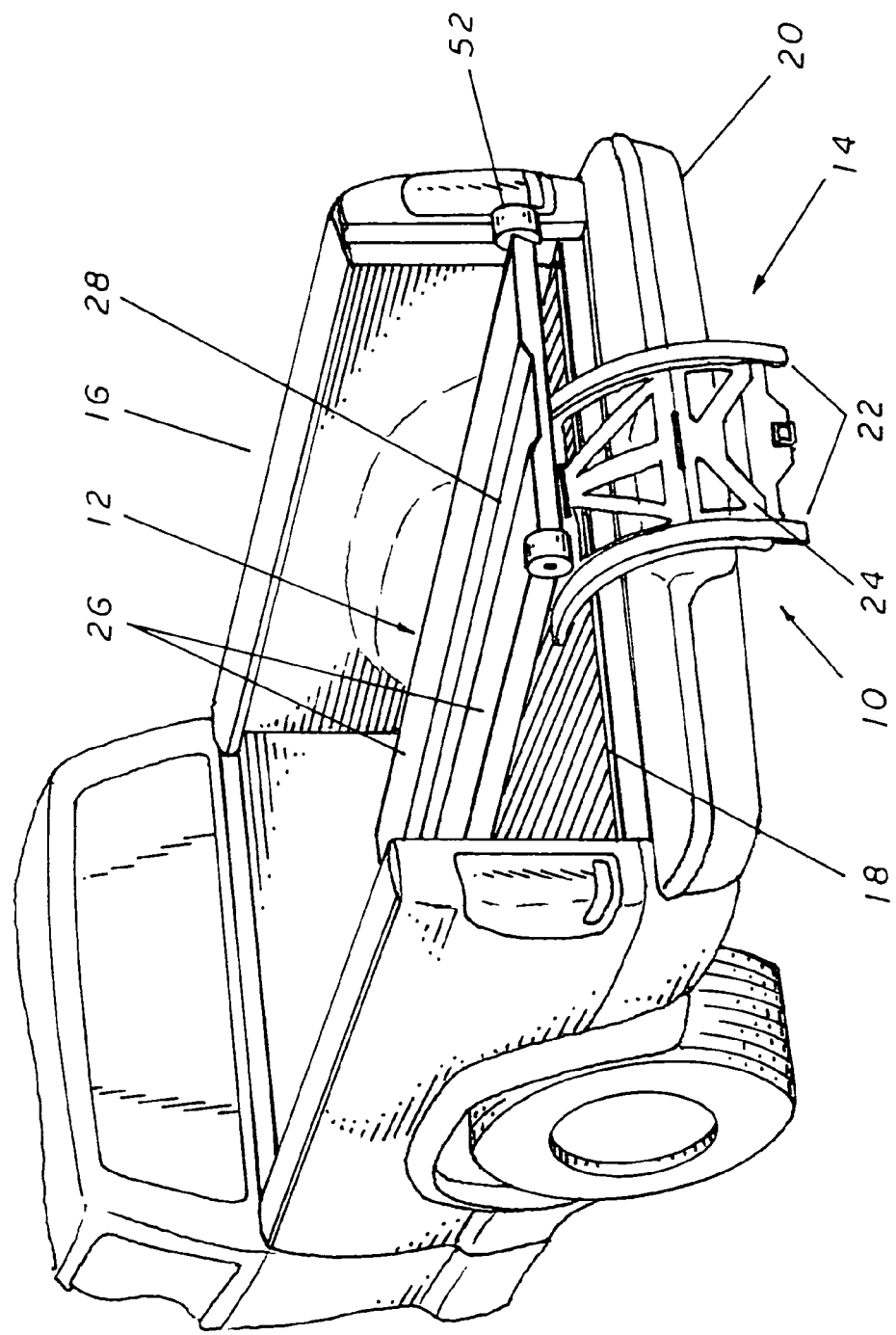
FIG. 1 is a perspective view of the present invention as used in conjunction with a pickup truck and illustrates its general configuration.
Figure 7:
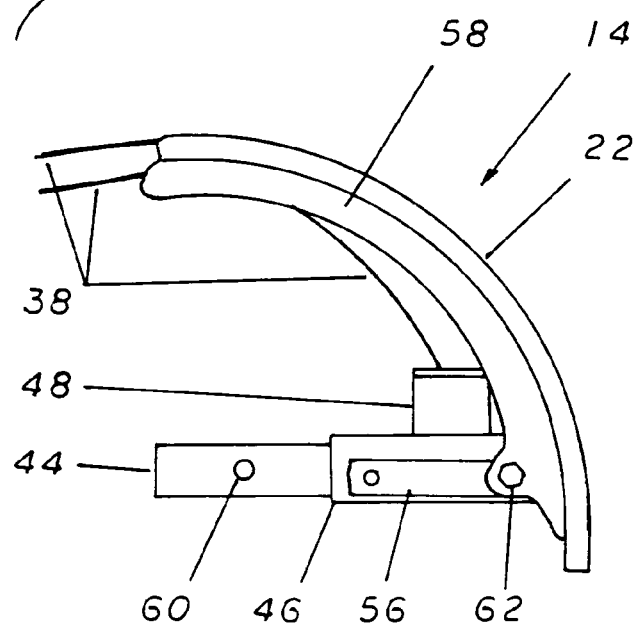
FIG. 7 is a side elevation view of the slide body component of the present invention illustrating its general configuration.
Figure 8:
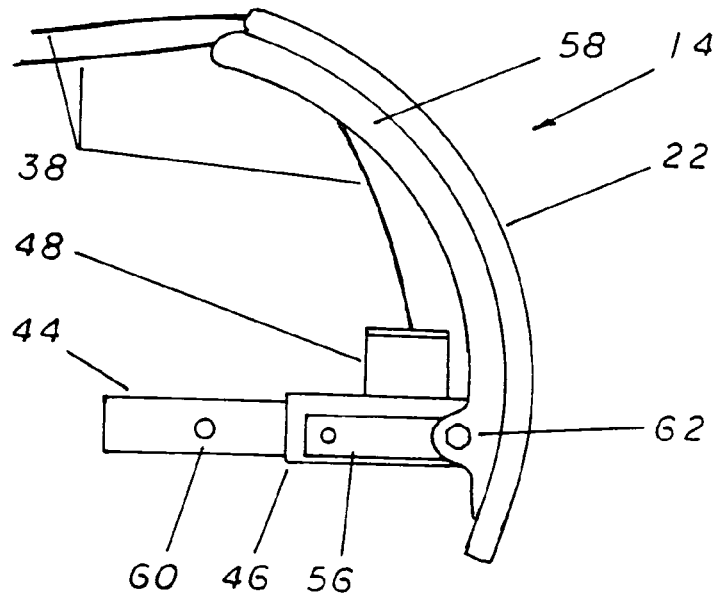
FIG. 8 is a side elevation view of the slide body component of FIG. 7 illustrating the pivotal nature of the slide rails allowing it to be employed with pickup trucks of varying bed heights.
Figure 9:
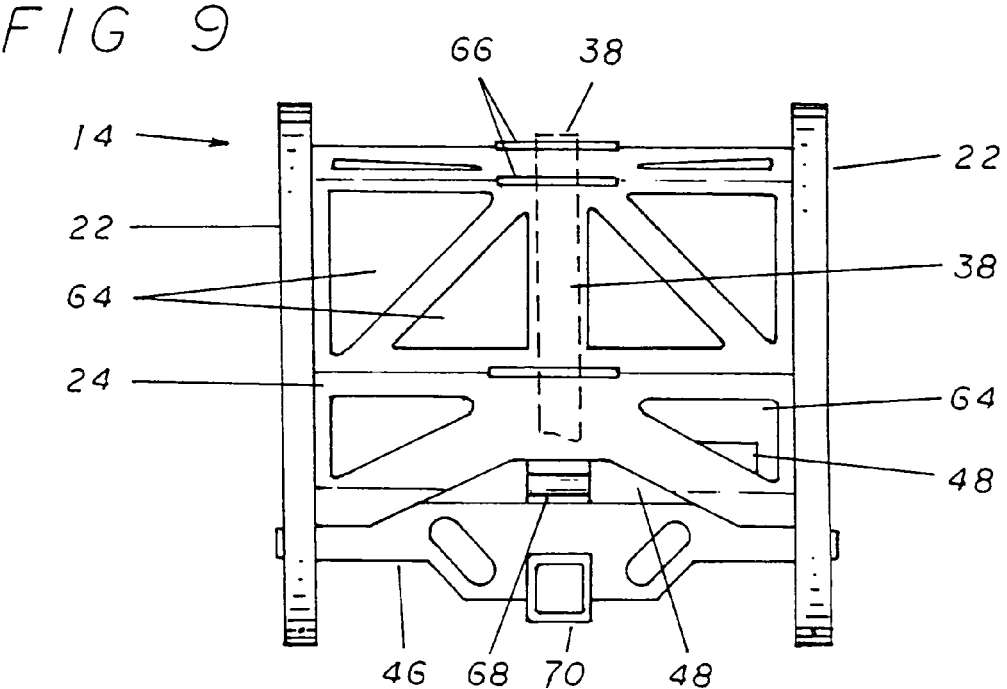
FIG. 9 is a rear elevation view of the slide body component of the present invention of FIG. 7 illustrating its general overall configuration and the location of the outer loop of the strap.
Figure 10:
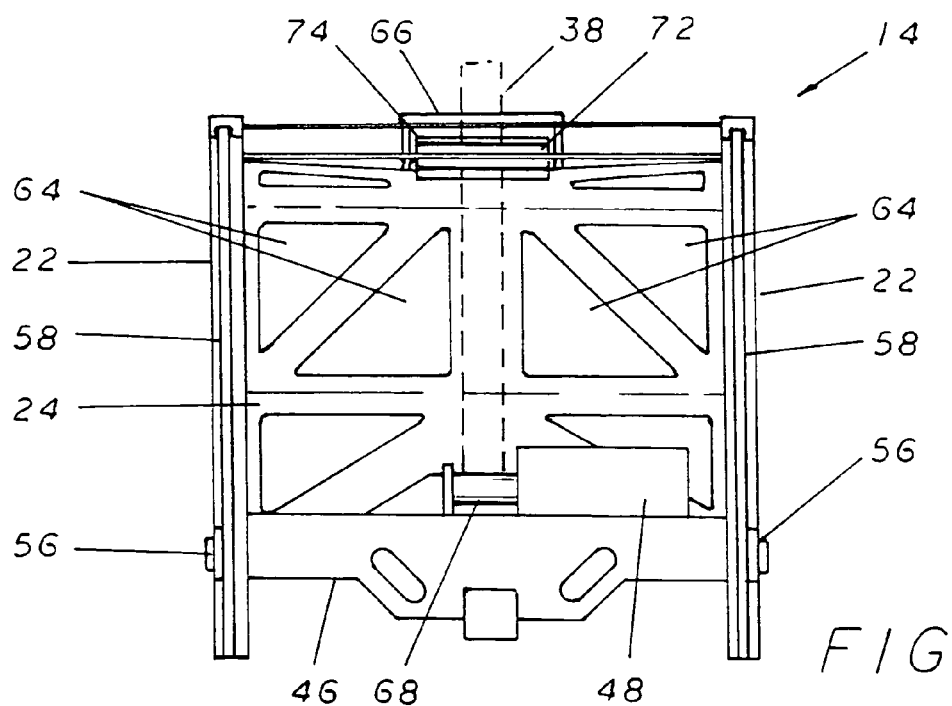
FIG. 10 is a front elevation view of the slide body component of the present invention of FIG. 7 illustrating the position and orientation of the winch and the associated inner loop of the strap.
Figure 14:
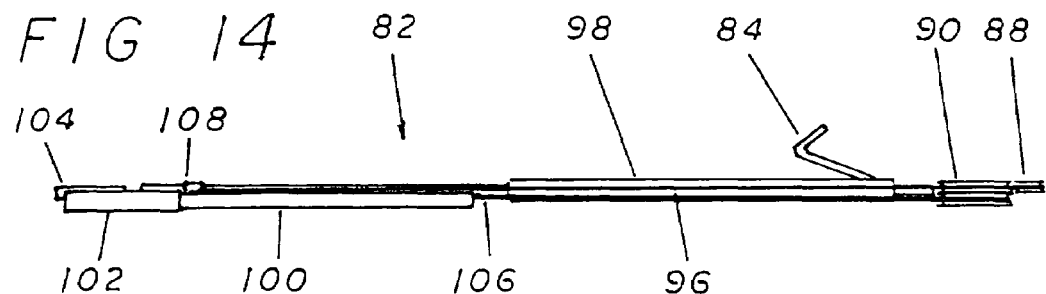
FIG. 14 is a side elevation view of the carriage loading system component of the present invention of FIG. 13 illustrating the orientation of its major components.
Figure 15:
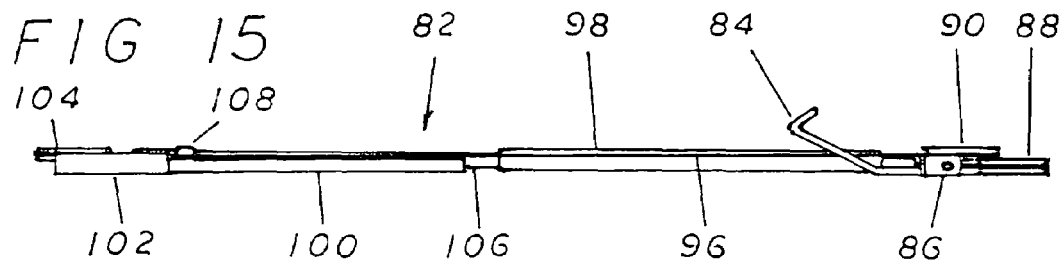
FIG. 15 is a reverse side elevation view of the carriage loading system component of the present invention of FIG. 14 illustrating the orientation of its major components.
Figure 16:
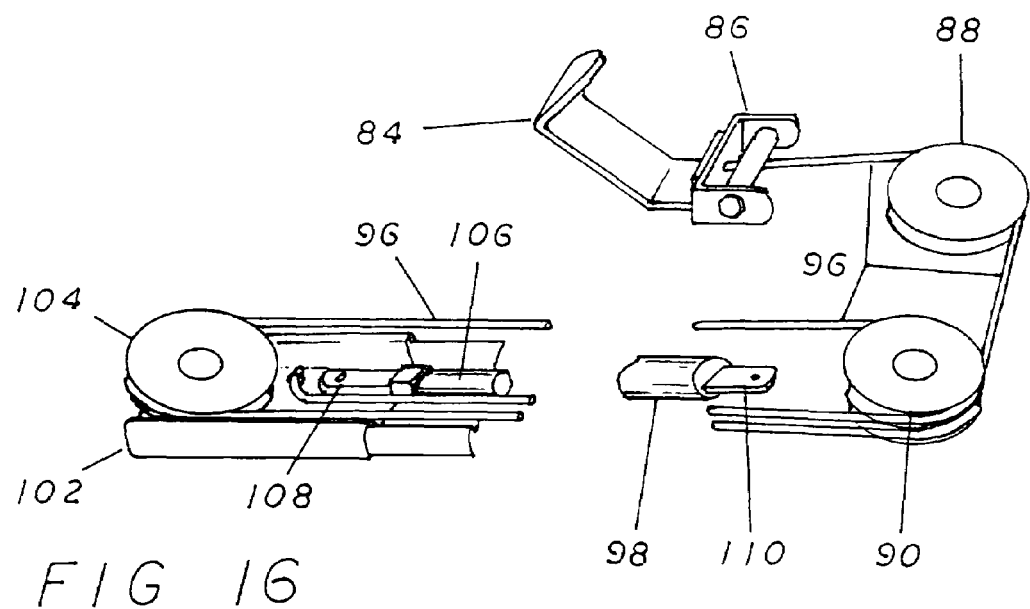
FIG. 16 is a perspective view of the major components of the carriage loading system of the present invention illustrating the manner by which they operate to perform the desired loading operation.

Referring now to the drawings, and more specifically to FIGS. 1, 2, 3, the motorcycle loading and unloading apparatus 10 is composed of two primary components, the carriage 12 and the slide body 14. The carriage 12 is the component of the present invention which serves to provide the mounting point for the motorcycle 30 (or other cargo) and which also facilitates its transport into the pickup truck 16 and onto the truck bed 18. The carriage 12 is generally a rectangularly shaped component of the present invention which has a carriage wheel 52 located at each of its corners. The purpose of the carriage wheels 52 is to provide a means by which the carriage 12 can be easily moved across the ground 54 with a minimal amount of effort. The body of the carriage 12 is made up of two outer carriage surfaces 26 and a recessed surface 28 positioned longitudinally between the two outer carriage surfaces 26. This configuration forms a central depression which helps to both retain and properly position the motorcycle 30 on the carriage 12 for the loading and unloading operations of the present invention.

The slide body 14 component of the present invention operates to both facilitate the movement of the carriage 12 and to guide it from the ground 54 into the pickup truck 16. The slide body 14 also provides the means by which the present invention is attached to the pickup truck 16. The slide body 14 is made up of a slide body frame 24 which is formed into a shape resembling a quarter circle and which provides for the point of attachment for the remaining components of the slide body 14. On either outer edge of the slide body frame 24 a perpendicularly oriented rail frame 58 is attached. The rail frames 58 provide for the placement of the two slide rails 22 in a position so that they mimic the shape of the slide body frame 24 in a manner so that their upper surfaces are raised significantly above the outer surface of the slide body frame 24. This manner of mounting the slide rails 22 to the slide body 14 allows other objects to ride along the outer surfaces of the slide rails 22 without coming into contact with the slide body frame 24, a feature that is important to the operation of the present invention.

As described above, the motorcycle 30 is mounted to the carriage 12 to facilitate its loading into the pickup truck 16. This is accomplished by initially placing it into the recessed surface 28 in the central portion of the carriage 12 and positioning one of the motorcycle's wheels 34 into a wheel brace 76 which is itself attached to the upper surface of the carriage 12 at suitable point. The motorcycle wheel 34 is then placed within the wheel brace 76 and secured thereto by a suitable means. This functions to secure the motorcycle 30 to the carriage 12 enabling it to be moved into the pickup truck 16. Once this has been accomplished, additional securement straps 32 are employed to tie the motorcycle to the pickup truck 16 ensuring that it will remain securely within the pickup truck 16 during transport.

The manner in which the carriage 12, and the attached motorcycle 20, is lifted into the pickup truck 16 and the manner employed to attach the slide body 14 are further detailed in FIGS. 4, 5, and 6. The attachment of the slide body 14 to the pickup truck 16 is accomplished by the use of the receiver tongue 44 which extends from the most rearward surface of the frame platform 46 component of the slide body frame 24. The receiver tongue 44 fits within the receiver hitch 42 which in turn is mounted to the pickup frame 40 of the pickup truck 16. The receiver tongue 44 is maintained in this position by the use of a retainer pin 45 which passes through the receiver hitch 42 and the receiver mount hole 60 of the receiver tongue 44. This attachment method ensures that the slide body 14 will be properly positioned so that the upper ends of the slide rails 22 will extend up and over the pickup truck's 16 bumper 20 and onto the truck bed 18. The use of the receiver tongue 44 also allows the slide body 14 to be quickly removed from the pickup truck 16 thereby freeing up the entirety of the truck bed 18 for alternative uses.

The process of lifting the carriage 12 from the ground 54 into the truck bed 18 is accomplished by the use of an electric winch 48 which is mounted to the upper surface of the frame platform 46 behind the slide body frame 24. The winch 48 is generally powered through a connection with the pickup truck's 16 electrical system but is capable of using an alternative power source if necessary. The winch 48 contains a strap cylinder 68 which it drives in a rotational manner which in turn is attached to one end of a carriage strap 38. The rotation of the strap cylinder 68 operates to wind and unwind the carriage strap 38 which in turn controls the position of the carriage to which its other end is attached.

Figure 20:
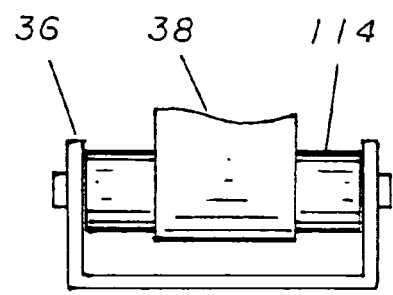
FIG. 20 is a top elevation view of the forward pulley component of the present invention illustrating its manner of construction and the way that it interacts with the strap.

From the attachment at the winch 48, the carriage strap 38 extends upwards to the upper portion of the slide body 14 where it then travels outward over the upper surface of the truck bed 18. This outward travel continues until the carriage strap 38 reaches the most forward end of the truck bed 18. At this point, the carriage strap 38 engages the forward pulley 36 which redirects it back towards the slide body 14. The forward pulley 36, which is further detailed in FIG. 20, consists primarily of the strap cylinder 114 which is rotationally mounted within the forward pulley 36 and over which the carriage strap 38 passes to reverse its direction of travel. Thus, the purpose of the forward pulley 36 is to position the point of pull placed on the carriage strap 38 at the most forward point possible. In this manner, anything attached to the other end of the carriage strap 38 (namely the forward end of the carriage 12) can be pulled all the way into the truck bed 18 to facilitate its secure loading.

After leaving the forward pulley 36, the carriage strap 38 passes over the slide body 14 and attaches to the most forward end of the carriage 12. Therefore, as the winch 48 winds up the carriage strap 38, it begins to draw the carriage 12 forward towards the pickup truck 16. Additionally, the forward corners of the carriage 12 are fitted with a pair of upwardly extending rail guides 50. The rail guides are configured so that they engage the two slide rails 22 of the slide body 14 in the early stages of the loading operation. The purpose of the rail guides 50 is to ensure that the carriage 12 is properly positioned with respect to the slide body 14 in the early stages of the loading operation. By accomplishing this alignment early in the procedure, the rail guides 50 ensure that the proper orientation will be maintained throughout all phases of the loading and unloading operations.

As the loading process progresses, the winding of the carriage strap 38 lifts the forward end of the carriage 12 off of the ground 54. In this circumstance the rail guides 50 become disengaged from their contact with the slide rails 22 which then support the lower surface of the carriage 12 itself thus allowing the carriage 12 to pass over the slide body 14 as illustrated in FIG. 5. Finally, the loading process is completed by the drawing of the carriage 12 all the way to the front of the truck bed 18. This is facilitated by the carriage strap 38 and the forward pulley 36 as described above and illustrated in FIG. 6. Thus, the carriage is positioned by the operation of the winch 48 and attached carriage strap 38 in such a manner so that the operation of the present invention provides a means by which a motorcycle 30 can be effectively lifted into the back of a pickup truck 16 by a single person and safely stored there for transportation. Upon reaching the desired location or at the desired time, the invention also then provides a means by which that person can then safely unload the motorcycle 30 without the aid of others.

The general configuration of the slide body 14 and its manner of construction are illustrated in FIGS. 7, 8, 9, and 10. As previously stated, the slide body 14 is composed primarily of a slide body frame 24 that is generally shaped like a quarter circle when viewed from the side. The outer edges of the slide body frame 24 provide the point of attachment for the rail frames 58 which extend therefrom at perpendicular angles and in turn provide the point of attachment at their upper edges for the slide rails 22. The slide rails 22 are made from a high molecular weight plastic which is both durable and slippery. The use of this material provides a surface which will facilitate the necessary movement of the carriage 12 while still forming a long lasting component of the invention.

The lower inside surfaces of the rail frames 58 also provide the point of attachment for the frame platform 46 and the connecting brackets 56. This connection at the pivot point 62 is pivotal in nature and is accomplished by passing a bolt through the relevant components. The pivotal nature of the connection of the rail frames 58 and therefore, the associated slide body frame 24 and slide rails 22, to the frame platform 46 allows these components to rotate in relation to one another. The importance of this feature of the present invention is that it provides a method by which the position of the upper ends of the rail frames 58 can be altered in relation to the frame platform 46. This is an important feature of the present invention as it allows the slide body 14 to be mounted to pickup trucks 16 of varying makes that may have truck beds 18 of differing heights from their respective receiver hitches 42.

These FIGURES also illustrate the general configuration of the frame platform 46 and detail two of its other basic functions. The first of these functions is providing the point of attachment for the winch 48. As described above, the winch's 48 function is to control the position of the carriage 12 in the loading operation of the present invention through its interaction with the carriage strap 38. This is accomplished by the winch's 48 rolling and unrolling of the carriage strap 38 on the attached strap cylinder 68 and the carriage strap's 38 attachment to the carriage 12 itself (to be further discussed below).

The second function of the frame platform 46 is to provide the point of attachment for the receiver tongue 44. The receiver tongue 44 is the component of the present invention which actually accomplishes the mounting of the slide body 14 to the pickup truck 16. Additionally, the design of the frame platform 46 also provides a mechanism by which an additional vehicle, such as an auxiliary trailer, can be connected and towed by the pickup truck 16 even though its receiver hitch 42 is employed to attach the slide body 14. This is accomplished by the use of the supplemental receiver hitch 70. The supplemental receiver hitch 70 is essentially an extension of the pickup truck's 16 receiver hitch 42 which extends out behind the rearward most surface of the slide body 14.

These FIGURES also illustrate a general feature in the construction of the slide body frame 24 which contains a plurality of lightening holes 64 built into its surface. The purpose of the lightening holes 64 is to lighten the overall weight of the slide body 14 making it more easily handled by the operator of the present invention. Additionally, the central area of the slide body frame 24 also contain a plurality of strap runners 66 protruding from its outer surface and positioned on the slide body frame's 24 most outward points. The purpose of the strap runners 66 is to provide the carriage strap 38 with a low friction surface over which it can run as it passes over the outer surface of the slide body 14 on its way to the forward end of the carriage 12. The use of the strap runners 66 ensures the carriage strap 38 will not be unnecessarily restrained in its movement and that it will not be subjected to frictional stresses due to its contact with the slide body 14.

The path of the carriage strap 38 as it passes along the inside surface of the slide body frame 24 from the winch 48 towards the forward pulley 36 is also aided by a specific component of the present invention. This component is the inner strap roller 72 which is positioned on the upper inside surface of the slide body frame 24. The inner strap roller 72 is rotationally attached in this location within the roller gap 74 so that it is freely rotatable. The carriage strap 38 passes over the top of the strap roller 74 and then out the back of the slide body 14 on the way to the forward pulley 36. The strap roller 74 provides a means by which the direction of travel of the carriage strap 38 from a nearly vertical orientation to a horizontal in a frictionless manner thereby increasing both its effectiveness and useable life.

The manner of construction of the carriage 12 and its related components are further detailed in FIGS. 11, 12, 13, 14, 15, and 16. As previously described, the rectangular body of the carriage is made up of two raised outer carriage surfaces 26 and a centrally positioned recessed surface 28. This configuration aids in the positioning and securement of the motorcycle 30 to its surface. Additionally, each corner of the carriage 12 is equipped with a carriage wheel 52 to facilitate its movement when on the ground 54. The lower surface of the carriage 12 illustrates the construction technique of two outer carriage frame rails 78 running along its long edges which are then connected by a plurality of cross members 80 thereby forming the base of the carriage 12. Additionally, the carriage 12 also serves as the point of attachment 39 of the carriage strap 38. The point of attachment 39 allows the carriage strap 38 to be removably secured to the carriage 12 thereby facilitating the loading of the carriage 12 into the pickup truck 16.

The lower surface of the carriage 12 also reveals the positioning and manner of construction of the carriage loading system 82. The carriage loading system 82 functions to place a reversing force on the carriage 12 when it is positioned in the fully loaded position within the pickup truck 16. This force aids in the unloading of the motorcycle by moving it rearward when the force restraining it is removed.

The carriage loading system 82 is made up of a charged cylinder 98 which is the component of the present invention which places the load on the carriage 12. To accomplish this, the charged cylinder 98 has a cylinder ram 106 that is attached to a moveable rail car 102 by the use of the ram mount 108 and at its rearward end. The rail car 102 is in turn mounted on the cylinder rail 100 which allows the rail car 102 to move forwards and rearwards along the length of the cylinder rail 100. Additionally, the charged cylinder 98 is fixedly mounted on its rearward end to the underside surface of the carriage 12 by the use of the cylinder mount 110. This method of attaching the charged cylinder 98 to the carriage 12 allows it to be compressed and to expand which is pivotal to the operation of the carriage loading system 82.

The rail car 102 also provides the point of attachment for the rail pulley 104 which is positioned on the rail car 102 just above the ram mount 108. Additionally, a double pulley 90 is mounted in a position just below the cylinder mount 110. This configuration places a pulley on either end of the charged cylinder 98. The mounting of the double pulley 90 is accomplished by the use of a double pulley mount 94 which is fixedly attached to one carriage frame rail 78 and one cross member 80. The double pulley mount 94 then provides for the point of attachment for the double pulley bracket 92 which in turn provides for the rotational attachment of the double pulley 90. Finally, a third hook pulley 88 is mounted inside of the position of the double pulley 90 on the centerline of the carriage 12.

These pulleys are all connected and surrounded by a cable 96 which is in turn attached at one end to the rail car 102 and at the other to the hook 84. The hook 84 is a sharply curved piece of which extends well down below the lower surface of the carriage 12 and is the component of the carriage loading system 82 which is employed to load the charged cylinder 98. The hook 84 is held in place in normal circumstances by the operation of the hook bracket 86 which is in turn fixedly attached to the lower surface of the carriage 12. This positions the hook 84 in line with the hook pulley 88 on the centerline of the carriage 12.

From its connection to the hook 84, the cable 96 passes around the outer side of the hook pulley 88 and to the upper groove of the double pulley 90. From the upper groove of the double pulley 90, the cable 96 then travels along the length of the charged cylinder 98 before engaging and encircling the rail pulley 104. From the rail pulley 104 the cable 96 travels back up the other side of the charged cylinder 98 to engage and encircle the lower groove of the double pulley 90. Finally, after leaving the lower groove of the double pulley 90, the cable travels back up the side of the charged cylinder 98 until its end is fixed to the upper surface of the rail car 102. Thus, the cable 96 ties all the components of the carriage loading system 82 together producing a system in which an action on one component (notably the hook 84) will produce a specific result in the others.

Figure 17:
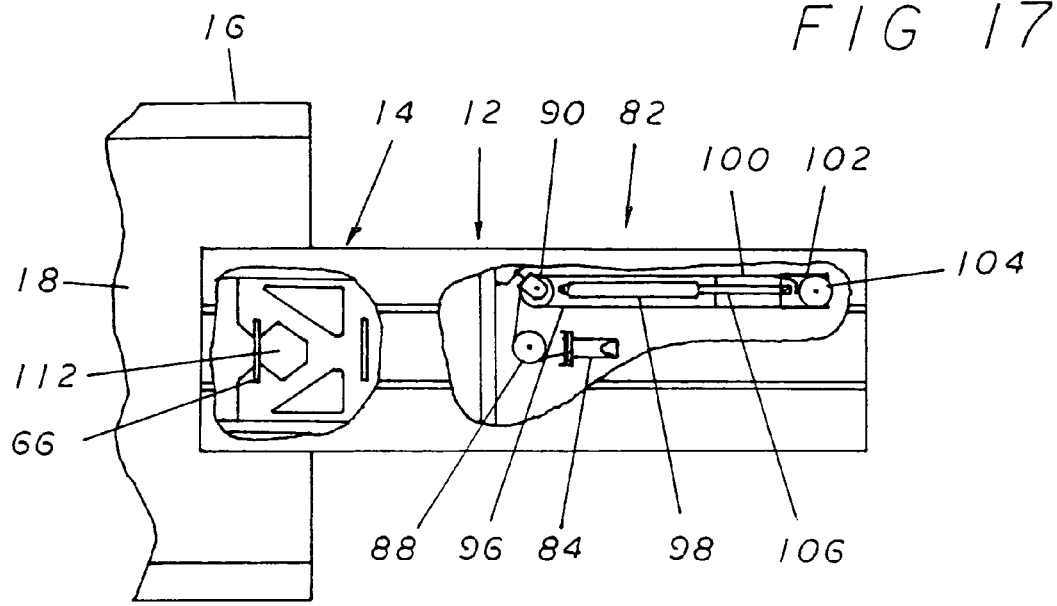
FIG. 17 is a top elevation cut-away view of the carriage and carriage loading system of the present invention illustrating the orientation of the relevant components in the early stages of the motorcycle loading operation.
Figure 18:
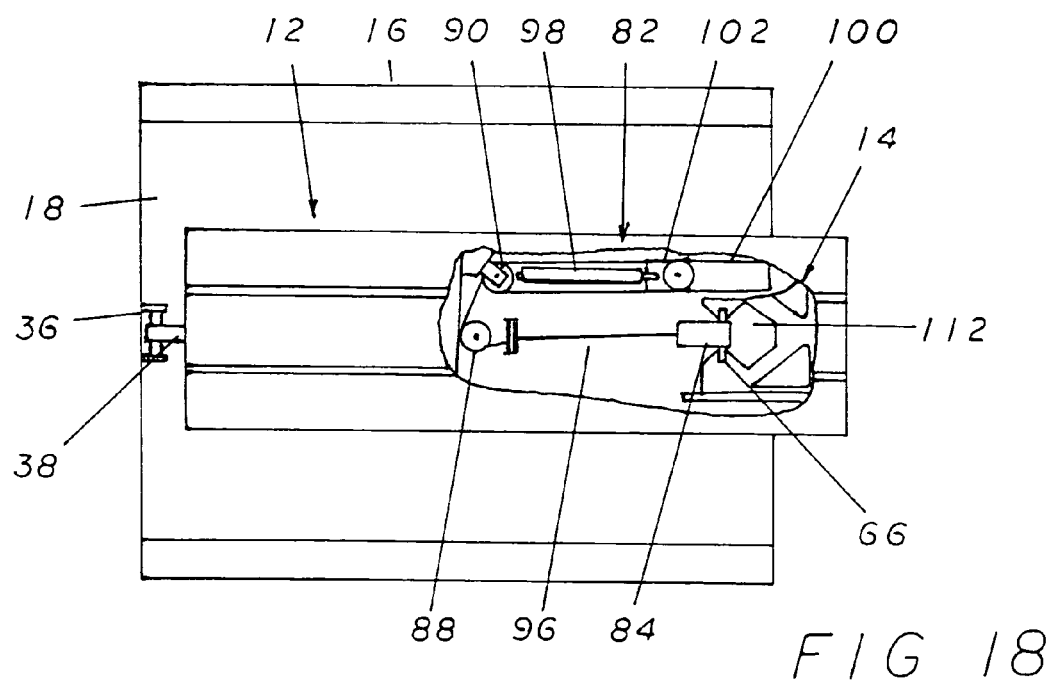
FIG. 18 is a top elevation cut-away view of the carriage and carriage loading system of the present invention of FIG. 17 illustrating the orientation of the relevant components in the late stages of the motorcycle loading operation.

The operation of the carriage loading system 82 is illustrated in FIGS. 17 and 18. In the initial stages of moving the carriage 12 into the pickup truck 16, FIG. 17, the components of the carriage loading system 82 are in an unload orientation with the charged cylinder 98 fully extended. As the carriage 12 is drawn over the slide body 14 and into the pickup truck 16, the hook 84 comes into contact with the hook catch 112. The hook catch 112 is a lightening hole 64 in the upper central portion of the slide body frame 24 which has a forward end that is closed off by the upper most strap runner 66. The hook 84 engages this strap runner 66 which in turn anchors it there in place.

As the action of the carriage strap 38 continually draws the carriage 12 into the pickup truck 16, the hook 84 is drawn out bringing the attached cable 96 with it. This serves to pull the double pulley 90 and the rail pulley 104 together by sliding the rail car 102 down the length of the cylinder rail 100. This closing action compresses the charged cylinder 98 which places the retracting force on the carriage 12. As long as the pressure is maintained on the carriage strap 38, the charged cylinder 98 will remain compressed and the carriage will remain in position within the pickup truck 16. However, if the pressure is released from the carriage strap 38, the charged cylinder 98 is free to expand which in turn will force the carriage 12 towards the rear of the truck bed 18. This rearward movement of the carriage 12 initiates the process resulting in the unloading of the contained motorcycle 30.

Figure 19:
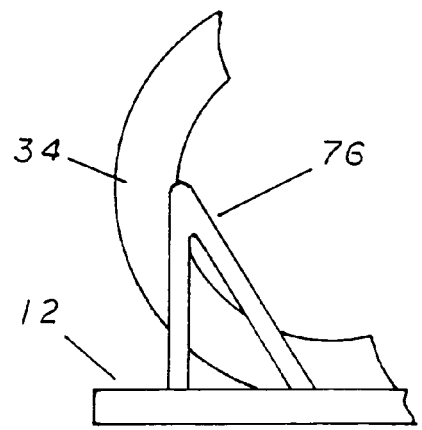
FIG. 19 is a side elevation view of the tire brace component of the present invention illustrating its configuration and the manner by which it interacts with the front tire of a motorcycle.
Figure 24:
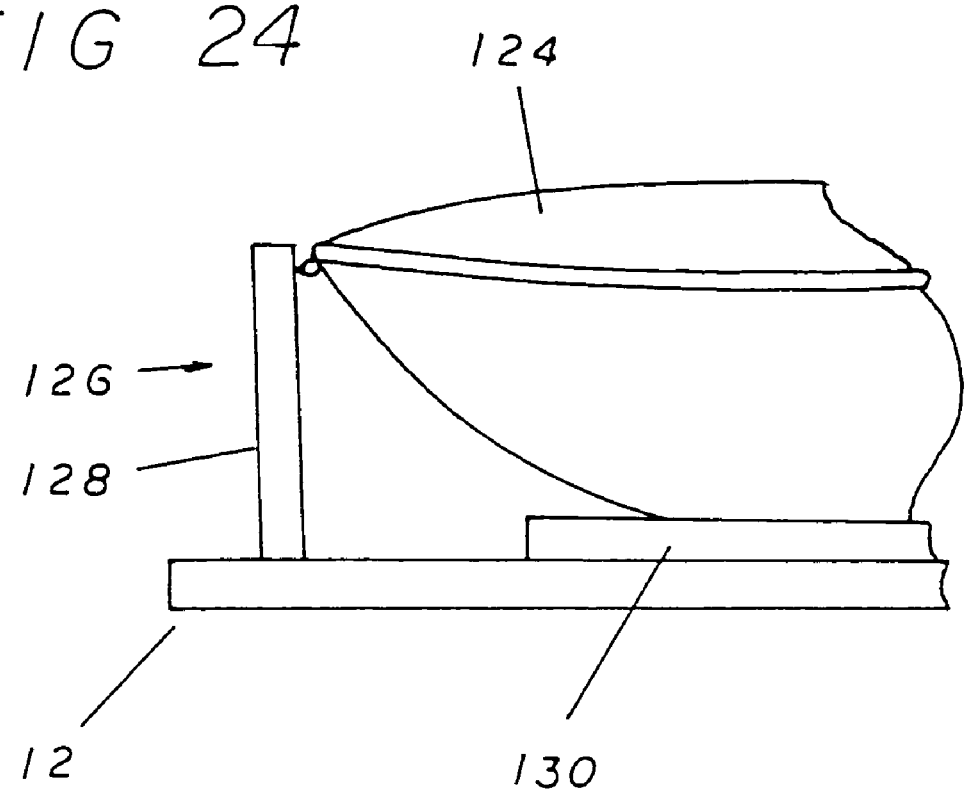
FIG. 24 is a side elevation view of the personal water craft brace component of the present invention illustrating its general configuration and the manner in which it is employed to contain a personal water craft on the carriage component of the present invention.

FIGS. 19 and 24 illustrate the use of auxiliary equipment that further facilitates the attachment of vehicles to the carriage 12. The first of these is the wheel brace 76 illustrated in FIG. 19. The wheel brace 76 is composed of a pair of upwardly extending brackets that are positioned in relation to one another so that a motorcycle wheel 34 can be positioned between them. Once this is accomplished, the motorcycle wheel 34 can be secured there which in turn anchors the motorcycle 30 to the carriage 12. FIG. 24 illustrates the manner of construction of a personal water craft (PWC) mount 126. The PWC mount 126 allows the present invention to be employed to facilitate the transport of a PWC 124 by the use of a pickup truck 16. The PWC mount 126 is composed of a vertically oriented PWC mount bracket 128 to which the forward point of the PWC is attached. Additionally, a pair of PWC mount slides 130 are attached to the upper surface of the carriage 12 in a position so that they engage the outer edges of the PWC 124 and hold it laterally in the desired position. Finally, it must be stated that the present invention could be designed to facilitate the loading of any number of differing cargo items all of which could employ a specialized mounting apparatus. The two illustrated examples are meant only to provide examples of what is possible and are not intended to be a complete listing of the appropriate mounting accessories to be used in conjunction with the present invention.

Figure 21:
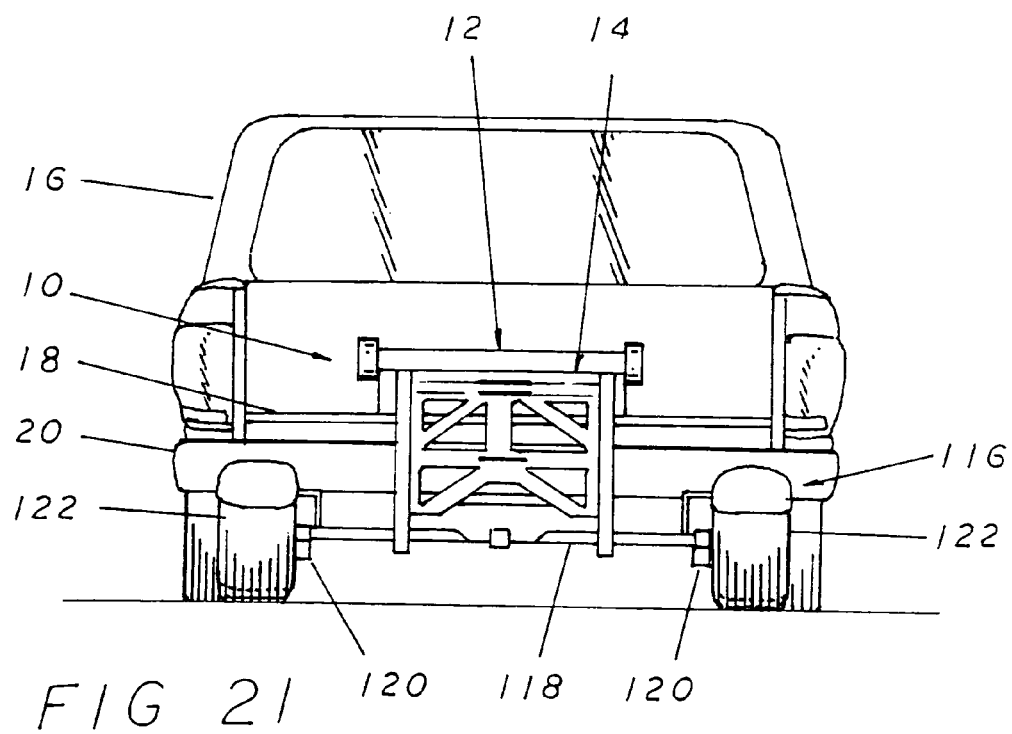
FIG. 21 is a rear elevation view of the present invention as attached to the rear of a pickup truck and including the optional component of the excess weight wheel assembly.
Figure 22:
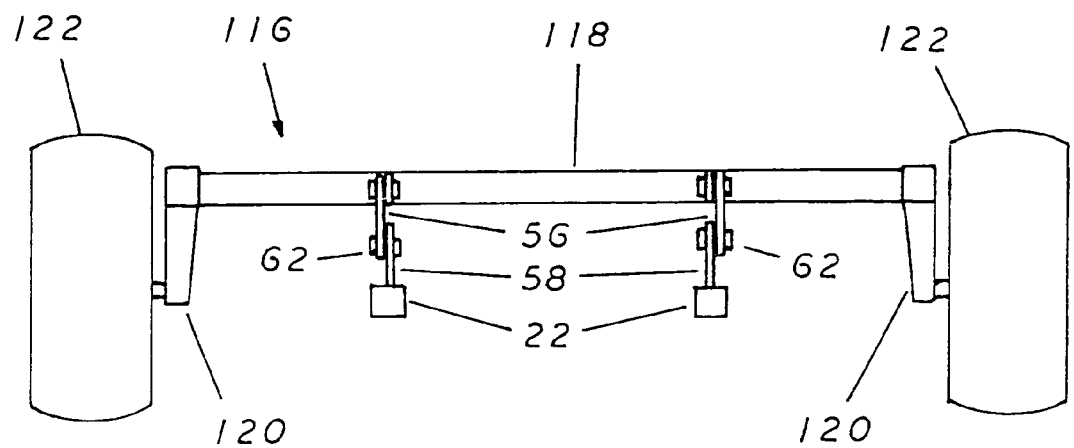
FIG. 22 is a top elevation view of the excess weight wheel assembly of FIG. 21 illustrating its configuration.
Figure 23:
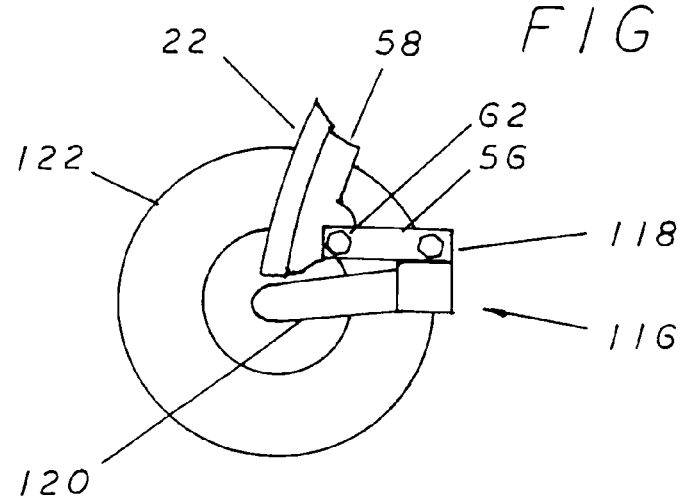
FIG. 23 is a side elevation view of one side of the excess weight wheel system of FIG. 21 illustrating the manner by which it is attached to the slide body component of the present invention.

Finally, the present invention can also come equipped with an excess weight wheel assembly 116 the manner of construction of which and the operation of are illustrated in FIGS. 21, 22, and 23. The excess weight wheel assembly 116 is an optional component that is employed in conjunction with the present invention in situations where the cargo that is to be transported weighs more than the pickup truck 16 is capable of safely carrying. The excess weight wheel assembly 116 eliminates this problem as it takes up the excess weight thereby allowing the present invention to be used to carry cargo that could not otherwise be transported.

The excess weight wheel assembly 116 is made up of a wheel frame 118 which is employed both to attach it to the slide body 14 and to position a pair of excess weight wheels 122 in a position so that they are capable of carrying the excess weight. The attachment of the wheel frame 118 to the slide body 14 is accomplished by the use of the connecting brackets 56 which span the distance between the wheel frame 118 and the rail frames 58. The excess weight wheels 122 are attached to the outer ends of the wheel frame 118 by the use of a pair of torsion bars 120 which also provide a suspension aspect to the excess weight wheel assembly 116. Thus, the excess weight wheel assembly 116 is designed to be used in conjunction with the present invention in situations where the weight of the cargo exceeds the carrying capacity of the pickup truck 16 being used.

Figure 25:
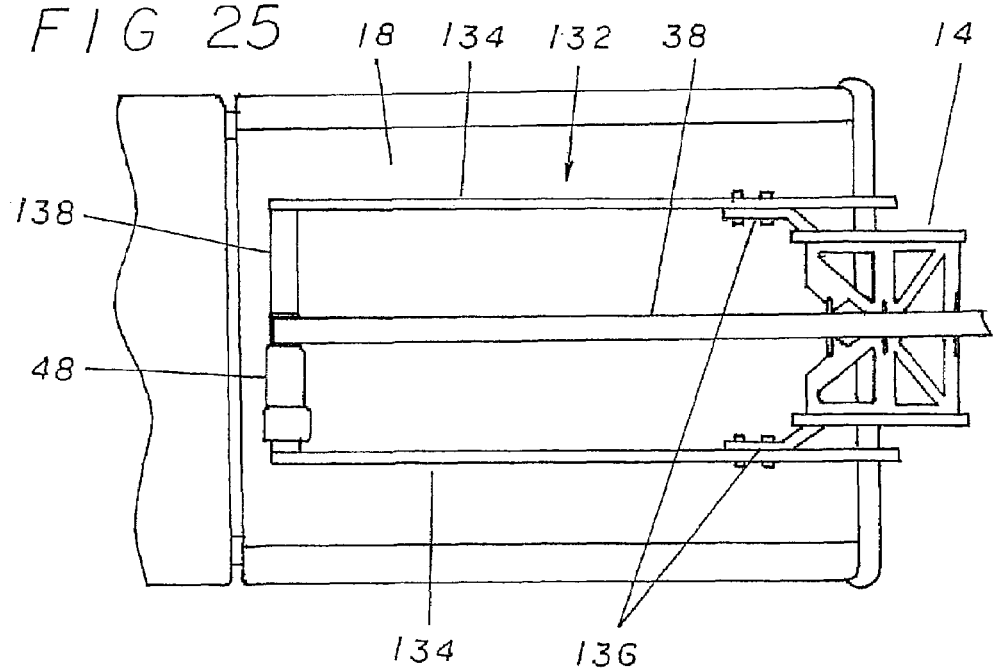
FIG. 25 is a top elevation view of an alternative embodiment of the present invention in which the winch component is moved forward on an external winch frame to move it forward within the pickup truck's bed.
Figure 26:
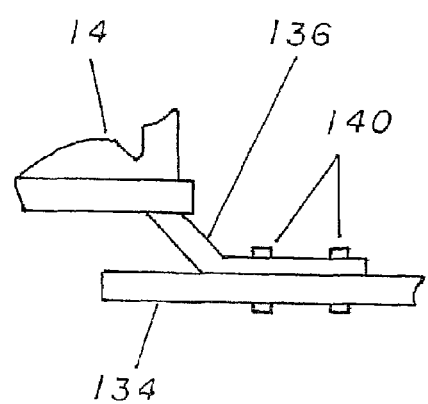
FIG. 26 is a top elevation view of the adjustment bracket of the alternative embodiment of the present invention of FIG. 25 in a first alternate position illustrating the manner by which the winch frame can be altered to change the location of the winch.
Figure 27:
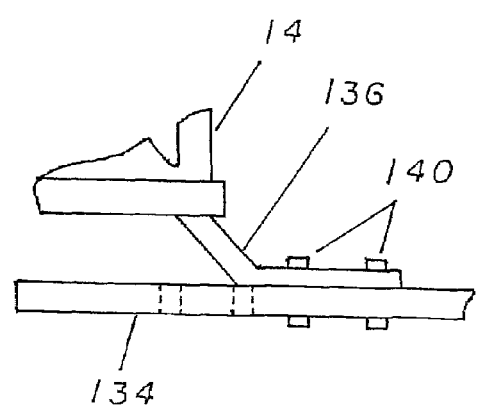
FIG. 27 is a top elevation view of the adjustment bracket of the alternative embodiment of the present invention of FIG. 25 in a second alternate position illustrating the manner by which the winch frame can be altered to change the location of the winch.

An additional embodiment of the present invention employing the use of an adjustable winch frame 132 is illustrated in FIGS. 25, 26, and 27. The purpose of the adjustable winch frame 132 is to position the winch 48 in the forward portion of the truck bed 18. The placement of the winch 48 in this position allows for the elimination of the forward pulley 36 which is employed in the previous embodiment of the present invention to place the force point of the winch 48 in the proper point to fully draw the carriage 12 into the truck bed 18. This positioning of the winch 48 allows it to be connected to the carriage 12 through the carriage strap 38 directly without the need for the change of direction previously provided by the forward pulley 36. This configuration is more efficient and simpler and is therefore a more desirable manner of construction than the previous embodiment.

The adjustable winch frame 132 is made up of a pair of forward extending frame members 134 that extend along the upper surface of the truck bed 18 until they reach its most forward end. The rearward ends of the frame members 134 are attached to the outer surfaces of the slide body 14 by the use of the frame brackets 136. The frame brackets 136 are configured in such a manner so that they position the frame members 134 in a parallel manner to the outer surfaces of the slide body 14 and also in a manner so that they are positioned out and away from either side of the slide body 14. This method of construction positions the frame members 134 in the proper location so that they can provide the basis upon which the remaining components of the adjustable winch frame 132 can be built.

The most forward ends of the frame members 134 provide the point of attachment for the frame cross member 138. The frame cross member 138 serves both to tie the ends of the frame members 134 together and also to serve as the point of attachment for the winch 48. This positioning of the winch 48 allows it to engage and control the operation of the carriage strap 38 in a position so that it connects directly with the forward end of the carriage 12 without engaging the forward pulley 36 as with the previous embodiment of the present invention.

The adjustable nature of the adjustable winch frame 132 is derived from the design of the frame brackets 136 and from the presence of a plurality of positioning holes (not illustrated) drilled through the body of the lower portion of the frame members 134. The adjustability of this embodiment of the present invention allows it to be used in differing models of pickup trucks 16 which may have truck beds 18 of varying lengths. The relevant adjustments (illustrated in FIGS. 26 and 27) are made by removing the bolts 140 connecting the frame brackets 136 to the frame members 134 and moving the frame members 134 either forwards or rearwards to achieve the desired length of the adjustable winch frame 132. When this has been completed, the bolts are replaced and secured to regain the integrity of the adjustable winch frame 132.

Thus, the use of the adjustable winch frame 132 allows the winch 48 component of the present invention to be placed at the most forward end of a truck bed 18 where it can operate in the most efficient manner possible. To accomplish this desired goal, this embodiment of the present invention employs the use of an adjustable winch frame 132 allowing the device to be used effectively in all pickup trucks 16 regardless of the length of their truck bed 18.

Figure 28:
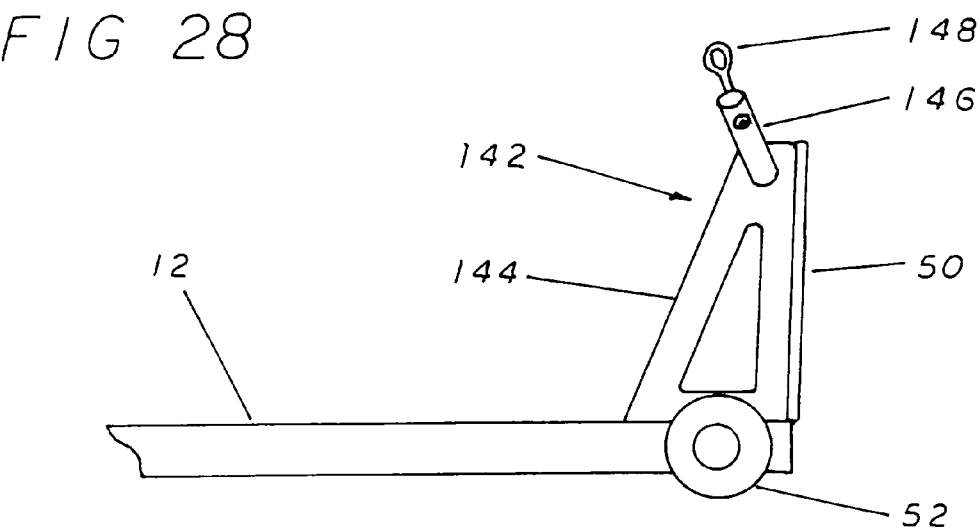
FIG. 28 is a side elevation view of the carriage component of the present invention which is equipped with an optional motorcycle tie down bracket.
Figure 29:
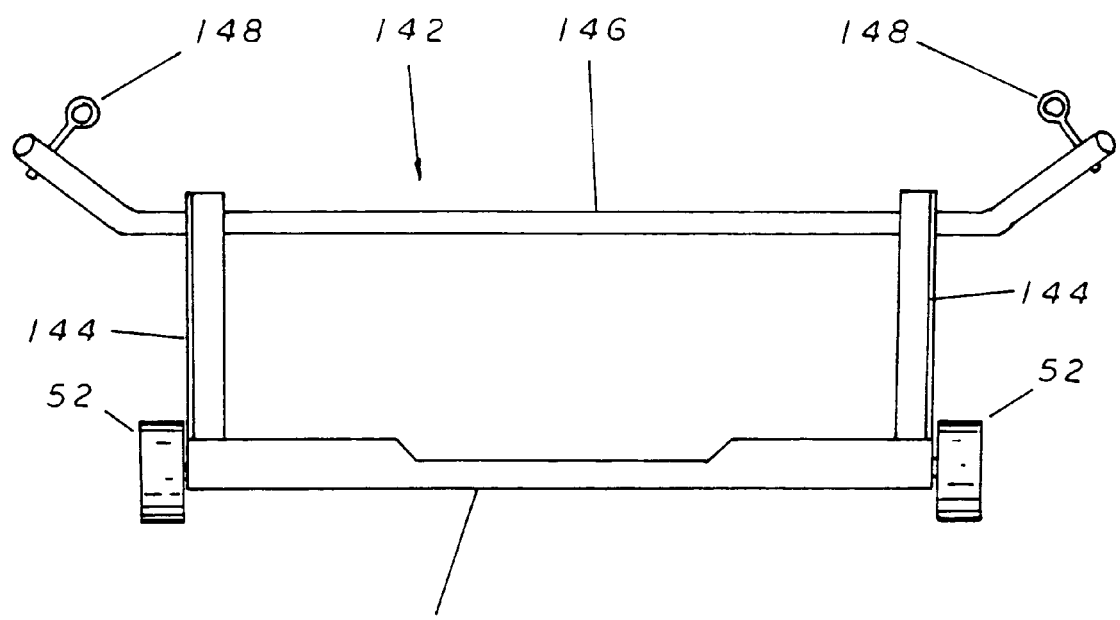
FIG. 29 is a front elevation view of the carriage component of FIG. 28 illustrating the configuration of the motorcycle tie down bracket.

An additional optional feature of the present invention is illustrated in FIGS. 28 and 29 which detail the manner of construction of the motorcycle tie down bracket 142. The motorcycle tie down bracket 142 is a feature that can be used in conjunction with the carriage 12 to aid in the securement of the motorcycle 30 within the present invention during transport. The purpose of the motorcycle tie down bracket 142 is to provide a means by which the motorcycle 30 can be secured to the carriage 12 in an upright position that is suitable for transport. This method of securing the motorcycle 30 makes the loading and unloading operations both easier and safer. This in turn reduces the risk of damage to the motorcycle 30 and potential for injuries to the operator that are commonly associated with these operations.

The motorcycle tie down bracket 142 is made up of a pair of triangular towers 144 which are attached to each upper forward corner of the carriage 12 and extend upwardly therefrom. Additionally, the triangular towers 144 are each positioned directly behind a corresponding rail guide 50. The triangular towers 144 serve to suspend the horizontally oriented bracket cross tube 146 in the desired position relative to the remaining components of the present invention and the motorcycle 30. The bracket cross tube 146 spans the distance between the two triangular towers 144 at a height that engages a motorcycle wheel 34 at a desired position. This positioning of the central portion of the bracket cross tube 146 provides an object that restrains the forward movement of the motorcycle wheel 34 holding it stationary in the longitudinal aspect with relation to the carriage 12. This then allows other forces to be placed on the motorcycle 30 to hold it against its point of contact with the bracket cross tube 146.

The outer ends of the bracket cross tube 146, or those portions extending beyond the points of attachment at the triangular towers 144, also serve as the mounting points for the tie down eyelets 148. This positioning of the tie down eyelets 148 places them at a point where a pair of securement straps 32 can be extended from each of the tie down eyelets 148 to the body of the motorcycle 30. The securement straps 32 each place an outward force on the motorcycle 30 which effectively operate to hold it in the desired vertical position. Thus, the use of the motorcycle tie down bracket 142 in conjunction with the carriage 12, provides a means by which a motorcycle 30 can be secured for transport prior to its being loaded into a pickup truck 16. This method of loading a motorcycle eliminates many of the risks associated with this procedure and is therefore a desirable option to be used with the present invention.

Although the present invention has been described in considerable detail with reference to certain preferred versions thereof, other versions are possible. Therefore, the spirit and scope of the appended claims should not be limited to the description of the preferred versions contained herein.

What is claimed is:

1. A loading and unloading apparatus for use on a vehicle bed on a vehicle having a rear end said loading and unloading apparatus comprising:

a frame platform having a first and second end, wherein said first end of said frame platform removably attaches to a rear end of a vehicle and wherein said frame platform extends in a horizontal manner when in use;

a curved slide body having an upper side, a lower side and a front and rear end, said upper side of said curved slide body having a first and second curved slide rail such that said slide rails are curved concave down in reference to said curved slide bodies upper side;

wherein said lower side of said curved slide body is pivotally attached to said second end of said frame platform adjacent said rear end of said vehicle and wherein said curved slide body pivots about said frame platform; and a carriage assembly having an upper side a lower side and a front and rear end said carriage assembly having a first and second rail guide extending upward from said front end of said carriage assembly;

wherein said first and second rail guide selectively engage said first and second curved slide rail.

2. A loading and unloading apparatus as in claim 1 further comprising an adjustable winch frame extending forward from said curved slide body and a winch mounted to the forward most portion of said adjustable winch frame.

3. A loading and unloading apparatus as in claim 1 further comprising a winch mounted on said frame platform, said winch further having a strap attached to said winch and said carriage assembly such that said strap is fed from said winch to a forward pulley and back to said carriage assembly.

4. A loading and unloading apparatus as in claim 1 wherein said frame platform further comprises a supplemental receiver hitch.

5. A loading and unloading apparatus as in claim 4 wherein said carriage assembly further comprises:

a carriage loading system having a charged cylinder with a first and second end said charged cylinder first end being fixedly attached to said carriage assembly and said second end of said charged cylinder being slidable attached to a cylinder rail on said carriage assembly; and a cable and pulley system having a hook on one end of said cable such that when said hook is pulled said cable and pulley system causes said second end of said charged cylinder to move along said cylinder rail.

6. A loading and unloading apparatus as in claim 5 further comprising an excess weight wheel assembly attached to said frame platform, said excess weight wheel assembly having a pair of wheels attached to a torsion bar.

7. A loading and unloading apparatus as in claim 5 wherein said carriage assembly further comprises a motorcycle wheel brace for attaching a motorcycle to said carriage assembly.

8. A loading and unloading apparatus as in claim 5 wherein said carriage assembly further comprises a personal water craft mount for attaching a personal watercraft to said carriage assembly.

9. A loading and unloading apparatus for use on a vehicle bed on a vehicle having a rear end said loading and unloading apparatus comprising:

a frame platform including a first end and a second end, wherein said first end is opposite said second end;

wherein said first end of said frame platform removably attaches to a rear end of a vehicle and wherein said frame platform extends from said rear end of said vehicle in a substantially horizontal manner;

a curved slide body including an upper side and a lower side, wherein said lower side of said curved slide body is pivotally attached to said second end of said frame platform adjacent said rear end of said vehicle and wherein said curved slide body is comprised of a curved concave-shaped configuration;

a first curved slide rail comprised of a curved concave-shaped configuration, wherein said first curved slide rail curves in a downward manner;

a second curved slide rail comprised of a curved concave-shaped configuration, wherein said first curved slide rail and said second curved slide rail extend from said upper side of said curved slide body and wherein said first curved slide rail and said second curved slide rail are parallel to said curved slide body;

wherein said second curved slide rail curves in a downward manner;

a carriage assembly including a front end and a rear end, wherein said carriage assembly is removably positioned upon said vehicle;

a first rail guide extending upwardly from said front end of said carriage assembly, wherein said first rail guide selectively engages said first curved slide rail; and a second rail guide extending upwardly from said front end of said carriage assembly, wherein said second rail guide selectively engages said second curved slide rail.

10. A loading and unloading apparatus as in claim 9, including an adjustable winch frame adjustably attached to said curved slide body, wherein said adjustable winch frame adjusts forwardly and rearwardly about said curved slide body via a pair of brackets and wherein said adjustable winch frame includes a winch opposite said curved slide body.

11. A loading and unloading apparatus as in claim 9, including:
a winch mounted upon said frame platform adjacent said second end of said frame platform, wherein said winch includes a strap attached to said winch and said carriage assembly; and
a forward pulley attached to said vehicle between said rear end and a front end of said vehicle, wherein said forward pulley is interconnected between said winch and said carriage assembly via said strap.

12. A loading and unloading apparatus as in claim 9 wherein said carriage assembly further comprises:
a carriage loading system having a charged cylinder with a first and second end said charged cylinder first end being fixedly attached to said carriage assembly and said second end being slidable attached to a cylinder rail on said carriage assembly; and
a cable and pulley system having a hook on one end of said cable such that when said hook is pulled said cable and pulley system causes said second end of said charged cylinder to move along said cylinder rail.

13. A loading and unloading apparatus as in claim 12 wherein said charged cylinder is in an extended configuration when said carriage assembly is positioned upon said vehicle and wherein said charged cylinder is in a retracted position when said carriage assembly is positioned upon a ground surface.

14. A loading and unloading apparatus as in claim 13 wherein said hook removably attaches upon said curved slide body when said carriage assembly is being loaded upon said vehicle.

15. A loading and unloading apparatus as in claim 14 wherein said charged cylinder provides a constant rearward force upon said carriage assembly when said carriage assembly is positioned upon said vehicle.

16. A loading and unloading apparatus as in claim 9, wherein said carriage assembly includes a plurality of carriage wheels, wherein said plurality of carriage wheels are rotatably attached upon a rear end of said carriage assembly and wherein said plurality of carriage wheels engage a ground surface.

17. A loading and unloading apparatus as in claim 9, wherein said carriage assembly engages said curved slide body between said front end and said rear end of said carriage assembly during loading and unloading of said carriage assembly from said vehicle.

18. A loading and unloading apparatus as in claim 9, including a supplemental receiver hitch extending from said second end of said frame platform.

19. A loading and unloading apparatus for use on a vehicle bed on a vehicle having a rear end said loading and unloading apparatus comprising:
a frame platform including a first end and a second end, wherein said first end is opposite said second end;
wherein said first end of said frame platform removably attaches within a receiver hitch upon a rear end of a vehicle and wherein said frame platform extends from said rear end of said vehicle in a substantially horizontal manner;
a curved slide body including an upper side and a lower side, wherein said lower side of said curved slide body is pivotally attached to said second end of said frame platform adjacent said rear end of said vehicle and wherein said curved slide body is comprised of a curved concave-shaped configuration;
a first curved slide rail comprised of a curved concave-shaped configuration, wherein said first curved slide rail curves in a downward manner;
a second curved slide rail comprised of a curved concave-shaped configuration, wherein said first curved slide rail and said second curved slide rail extend from said upper side of said curved slide body and wherein said first curved slide rail and said second curved slide rail are parallel to said curved slide body;
wherein said second curved slide rail curves in a downward manner;
a carriage assembly including a front end and a rear end, wherein said carriage assembly is removably positioned upon said vehicle;
a first rail guide extending upwardly from said front end of said carriage assembly, wherein said first rail guide selectively engages said first curved slide rail;
a second rail guide extending upwardly from said front end of said carriage assembly, wherein said second rail guide selectively engages said second curved slide rail;
an adjustable winch frame adjustably attached to said curved slide body, wherein said adjustable winch frame adjusts forwardly and rearwardly about said curved slide body via a pair of brackets and wherein said adjustable winch frame includes a winch opposite said curved slide body;
wherein said winch is comprised of an electric winch;
a carriage loading system having a charged cylinder with a first and second end said charged cylinder first end being fixedly attached to said carriage assembly and said second end being slidable attached to a cylinder rail on said carriage assembly; and
a cable and pulley system having a hook on one end of said cable such that when said hook is pulled said cable and pulley system causes said second end of said charged cylinder to move along said cylinder rail;
wherein said charged cylinder is in an extended configuration when said carriage assembly is positioned upon said vehicle and wherein said charged cylinder is in a retracted position when said carriage assembly is positioned upon a ground surface;
wherein said hook removably attaches upon said curved slide body when said carriage assembly is being loaded upon said vehicle;
wherein said charged cylinder provides a constant rearward force upon said carriage assembly when said carriage assembly is positioned upon said vehicle;
wherein said carriage assembly includes a plurality of carriage wheels, wherein said plurality of carriage wheels are rotatably attached upon said rear end of said carriage assembly and wherein said plurality of carriage wheels engage a ground surface;

wherein said carriage assembly engages said curved slide body between said front end and said rear end of said carriage assembly during loading and unloading of said carriage assembly from said vehicle.

* * * * *